United States Patent
Mao et al.

(10) Patent No.: US 6,805,645 B2
(45) Date of Patent: Oct. 19, 2004

(54) TOOTH CONTOUR STRUCTURE FOR LARGE SPROCKET SET OF BICYCLE

(75) Inventors: Tzuoh-Fei Mao, YiLan Hsien (TW); Chen-Der Cheng, TaoYuan (TW)

(73) Assignee: Apex Bicycle Components Corporation Ltd., TaoYuan Hsien (TW)

(*) Notice: Subject to any disclaimer, the term of this patent is extended or adjusted under 35 U.S.C. 154(b) by 0 days.

(21) Appl. No.: 09/976,002

(22) Filed: Oct. 15, 2001

(65) Prior Publication Data

US 2003/0073530 A1 Apr. 17, 2003

(51) Int. Cl.[7] ............................................. F16H 55/30
(52) U.S. Cl. .................................... 474/160; 474/152
(58) Field of Search .......................... 474/160, 152–156

(56) References Cited

U.S. PATENT DOCUMENTS

| | | | | |
|---|---|---|---|---|
| 5,192,248 A | * | 3/1993 | Nagano | 474/140 |
| 5,192,249 A | * | 3/1993 | Nagano | 474/160 |
| 5,464,373 A | * | 11/1995 | Leng | 474/140 |
| 5,716,297 A | * | 2/1998 | Bodmer | 474/78 |
| 5,738,603 A | * | 4/1998 | Schmidt et al. | 474/158 |
| 5,830,096 A | * | 11/1998 | Schmidt et al. | 474/156 |
| 5,876,296 A | * | 3/1999 | Hsu et al. | 474/160 |
| 6,007,442 A | * | 12/1999 | Schmidt | 474/122 |
| 6,022,284 A | * | 2/2000 | Bartolozzi et al. | 474/80 |

* cited by examiner

*Primary Examiner*—Marcus Charles
(74) *Attorney, Agent, or Firm*—Troxell Law Office PLLC

(57) ABSTRACT

A tooth contour structure for large sprocket set of bicycle having at least three characteristic teeth arranged on a larger sprocket of two adjacent sprockets, wherein the right side of a first characteristic tooth has a curve surface and a cut portion. Between the first characteristic tooth and a second characteristic tooth a tooth valley bottom edge has a projection surface biased toward the smaller sprocket. The arc of a top edge of the projecting surface is formed according to the path and curvature of the upper chain. The top edge has a slant angle. A recession is formed below the first characteristic tooth.

7 Claims, 7 Drawing Sheets

US 6,805,645 B2

TOOTH CONTOUR STRUCTURE FOR LARGE SPROCKET SET OF BICYCLE

FIELD OF THE INVENTION

The present invention relates to a tooth contour structure for large sprocket set of bicycle, especially to a kind of unique auxiliary structure arranged on a large sprocket for a bicycle large sprocket set, by the guidance of a speed converter, when the chain is made to be engaged with different sprockets for proceeding the shifting motion, an auxiliary chaining-up is added to raise the shifting efficiency for a tooth contour structure for large sprocket set of bicycle.

BACKGROUND OF THE INVENTION

Nowadays, all bicycles capable of proceeding multi-section speed changing evenly have been equipped with a large sprocket set rotated by a pedaling crank and arranged with a sprocket wheel set on the rear wheel. Wherein the large sprocket set is usually assembled by at most three sprockets of different sizes, while the sprocket wheel set is then commonly assembled by at least five sprockets of different sizes. The connection and transmission between the large sprocket set and sprocket wheel are carried out by a chain, and matched with the control of front and rear speed converters, the chain is made to be shifted to and engaged with the sprockets of different sizes for the large sprocket set and sprocket wheel set to reach the purpose of speed changing for a bicycle.

Since the difference for the tooth number between the larger sprocket and smaller sprocket of a bicycle large sprocket set is very large, so usually an appropriate device for chaining-up is needed to be arranged on the larger sprocket for making the chain be able to effectively be shifted-up from the smaller sprocket to larger sprocket accurately. Three methods are applied by prior arts for assisting chaining-up: the first kind of method is that by a structure of attached teeth, or a manner of split and projected teeth, or a manner of attached rivets, during the procedure for shifting-up the chain, the attached teeth, rivets, or split teeth may be used for holding the outer chain plate of the chain to make the chain be able to be raised up during the running procedure of the sprockets to reach the object of chaining-up and shifting-up. For example, U.S. Pat. No. 5,192,248 is then one example of them. However, since additional added material of different parts such as rivets etc. are needed for these kinds of structures of attached teeth or attached rivets and additional procedures are also needed for stamping and riveting, so obviously manufacturing procedures would be influenced and lots of manufacturing costs would be increased, and for the latter section of treatment of sprocket product (i.e. tempering or surface anode treatment), technique costs are also caused to increase because of the materials difference for the rivets or attached teeth with the sprockets or the influence of processing stress. Additionally, because the split teeth of the prior art further needs the method of forging for splitting, thinning, and sharpening the teeth, not only a forge with high tonnage is needed for forging and the processing is more difficult, but also the usage life of the die applied for the forging is shortened and its cost is higher, and the split teeth structure also would influence the part's strength for taking force and safety.

Furthermore, since the chain is alternatively comprised of an external and an internal chain pitch, so in the actual motion of shifting, there will be two different engaging states because of the different phases of engagement between the chain and sprockets, and that causes two different paths for shifting, and the only difference for two kinds of shifting path is the interchange between the external and internal chain pitch. When the auxiliary chaining-up structure of the aforementioned first prior art is facing this problem of two different kinds of chain shifting path, a set of attached teeth, attached rivets, or split teeth is additionally arranged at appropriate position of the different phases on the sprockets, when the chain can not successfully be shifted at the first teeth set because of inappropriate shifting path, the sprocket must continue to rotate for letting the chain be chained-up at the position of next set of attached teeth, attached rivets, or split teeth, but therefore shifting is caused to delay and the efficiency of shifting is lowered.

The second auxiliary chaining-up structure for the prior arts is that several convex points structure is formed by manufacturing procedure of stamping on appropriate positions of the larger sprocket, and the function of the convex points basically are completely same as that of the aforementioned rivets, which is also to raise the chain for auxiliary chaining-up, for example, the U.S. Pat. No. 5,413,534 is one of them. Although this convex points structure of the prior art may be manufactured by the stamping manufacturing procedure of lower cost, but its biggest shortcoming is that this kind of convex points structure is very easily occurred wearing-out phenomenon and caused the failure of shifting, so commonly it is adapted for second class products of low price. Since, when convex point is manufactured by stamping, the profile of the convex point must be arc-shaped, so during the procedure of shifting and chaining-up for the chain, when the chain is raised up by the outer chain plate butting against the convex point, while the chain bears larger load (i.e. the bicycle is under the states of upper-hill or urgent speeding-up), the chain will be very easily glided off the convex point, when the chain is glided off, the convex point is caused to be worn out, and effect for raising up the chain is further worse, therefore the chain is caused to be glided off more easily, and a bad circulation is become, and a further improvement is needed.

The third kind of auxiliary chaining-up structure for the prior art is that a "parallel moving tooth" structure with which central lines for front and rear tooth faces and tooth top all moving in parallel toward the smaller sprocket is formed by stamping several teeth of the larger sprocket in the direction toward the smaller sprocket to become a structure of auxiliary chaining-up for a chain. Although this kind of parallel moving teeth structure manufactured by stamping has the advantage of lower cost and may be theoretically adapted for two different kinds of shifting path for chain to raise the efficiency of shifting, but since the central lines for both front and rear tooth faces and tooth top of the parallel moving tooth (tooth thickness is about 1.8–2 mm) are all moving in parallel toward the smaller sprocket a distance about 1 mm, when the internal chain pitch (its internal width is only about 2–2.5 mm) of the chain is engaged with the parallel moving tooth, a colliding noise probably would be generated between the chain plate of the internal chain pitch and the parallel moving tooth under a high speed running. And, in this parallel moving structure of the prior art, since the cross-sectional edge of the parallel moving tooth (tooth contour) traditionally must be formed into a R angle (round arc angle) structure of round arc shape instead of right angle edge because of the stamping manufacturing procedure, and again in a traditional chain, a R angle (round arc angle) of round arc shape is formed at the edge of the side head portion of the chain plate for the external chain plate, and additionally, for this kind of parallel moving tooth of prior art for auxiliary chaining-up, when any kind of chain shifting path is under proceeding, the side head portion of the chain plate of the external chain plate for the chain is needed to "hold against" the edge of the tooth contour of the parallel moving tooth for raising up the chain and completing the chaining-up motion. However, since no matter whether the side head portion of the chain plate or the tooth contour of the parallel moving tooth are all round arc shape structure, so it is impossible to be inter-held-against with each other effectively, furthermore since the tension of the chain is concentrated on the contacting points between the chain plate side head and the parallel moving tooth because of lever principle, the side head portion of the chain plate is further made to be easily glided off from the parallel tooth. Furthermore, since the position for the parallel moving tooth to hold against the chain is relatively high (i.e., the position for holding against the chain is almost at the tooth point), obviously, the higher is the holding against position, the greater is the opportunity for falling down. Therefore, in actual operation, it is often happened that the chain plate side head falls down from the tooth contour to cause the failure situation of chaining-up (or shifting), especially when the chain is under the state of high load (or high tension), the probability for shifting failure is still relatively higher, therefore a further improvement room is still existent.

SUMMARY OF THE INVENTION

Therefore, the main object of the present invention is to address a bicycle large sprocket set teeth contour structure, which has both advantages of assisting the shifting job for two kinds of chain path and lower manufacturing cost by stamping manufacturing procedure to produce projection butting surface, and which further may overcome the embarrassment situation of easily shifting failure for the parallel moving tooth structure of the prior art when a kind of chain is needed a tooth point to raise itself for shifting path, and the shortcoming of easily generating noise during high speed operation.

DETAILED DESCRIPTION OF THE PREFERRED EMBODIMENT

Figure 1:
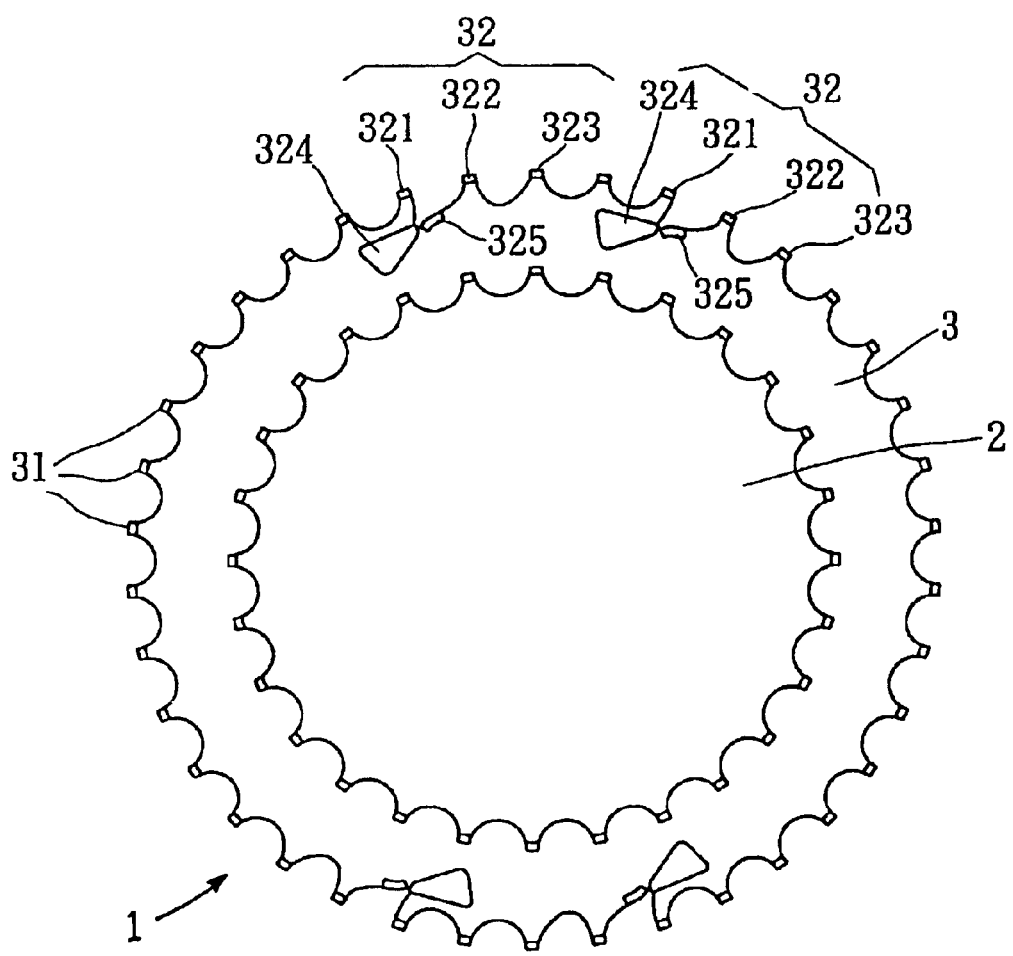
FIG. 1 is a preferable embodiment for the tooth contour structure for large sprocket set of bicycle of the present invention.
Figure 2:
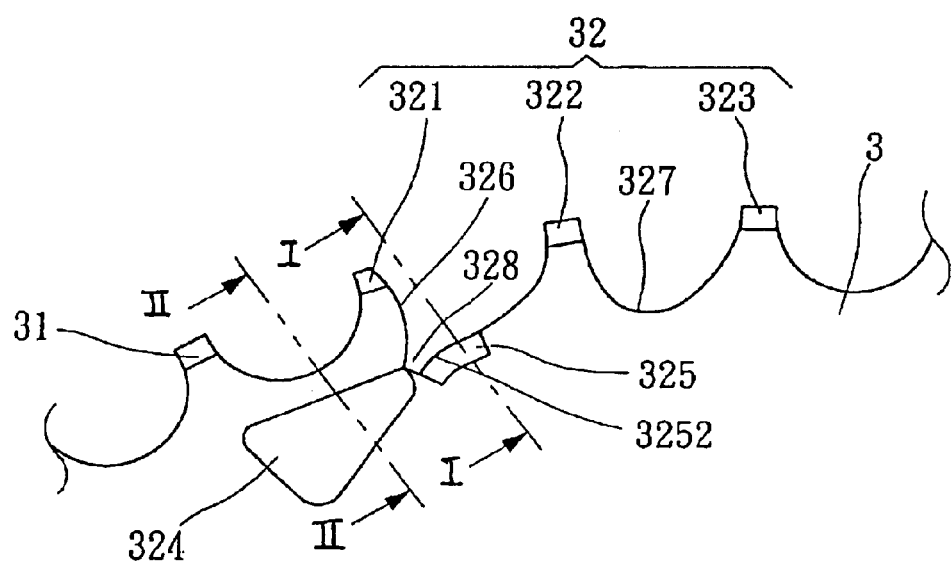
FIG. 2 is an enlarged structure illustration for the characteristic tooth of the large sprocket set of the present invention.

Please refer to FIG. 1 and FIG. 2, which show the tooth contour structure for large sprocket set of bicycle, wherein the large sprocket set 1 is comprised of plural sprockets with different sizes, in this embodiment, only two adjacent sprockets of which one is a smaller sprocket 2 and another is a larger sprocket 3 are addressed for description examples. When each sprocket for the larger sprocket set 1 is driven synchronically by a pedaling crank (not shown), the tooth contour structure for large sprocket set of bicycle of the present invention may facilitate the bicycle chain (no shown) shifted from the smaller sprocket 2 up to the larger sprocket 3 under being dragged by a speed converter (not shown), a shifting motion may be proceeded on the position of tooth structure by the assistance for chaining-up of the tooth structure.

In each tooth on the larger sprocket 3, basically they may be approximately divided into a first tooth group 31 and a second tooth group 32. Wherein large portion on the large sprocket 3 is belonged to the first tooth group 31 and is categorized to general tooth; at least one set of the second tooth group 32 is arranged on the large sprocket 3. Each set of the second tooth 32 all individually is comprised of at least three characteristic teeth, the three characteristic teeth along the direction of the chain's shifting-up are designated individually in sequence as a first characteristic tooth 321, a second characteristic tooth 322, and a third characteristic tooth 323.

Figure 4:
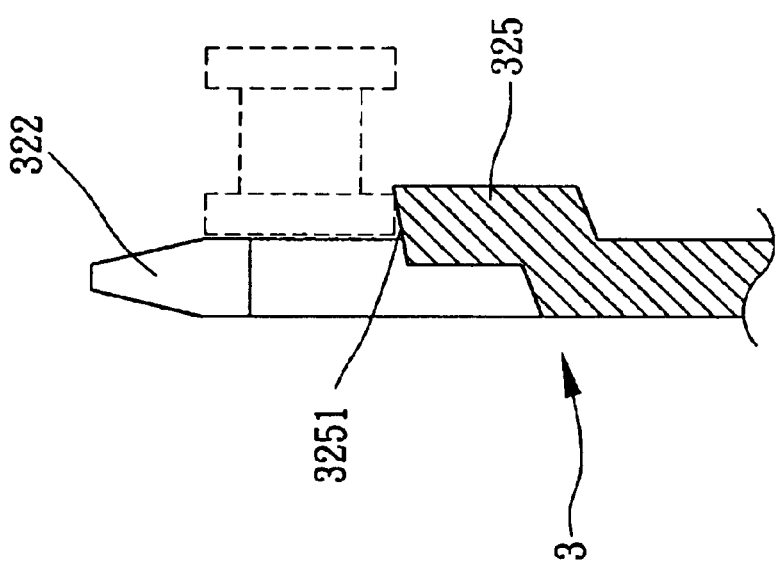
FIG. 4 is an illustration for "II—II" sectional view in FIG. 2 of the present invention.

The right side of the first characteristic tooth has a curve surface 326, which is located at non-force-acting side when the sprocket 3 drives the chain 4 to rotate (i.e. the right side of the first characteristic tooth as shown in FIG. 2) and its circular measure is distinctly different from that of the general first tooth group 31, the function of this curve surface 326 will be described in detailed later. A recession 324 is also arranged at lower portion of the first characteristic tooth 321, and the recession 324 is extended to the bottom neighborhood of the front tooth, and it is preferably formed by stamping, in the mean time, please refer to FIG. 4.

Figure 3:
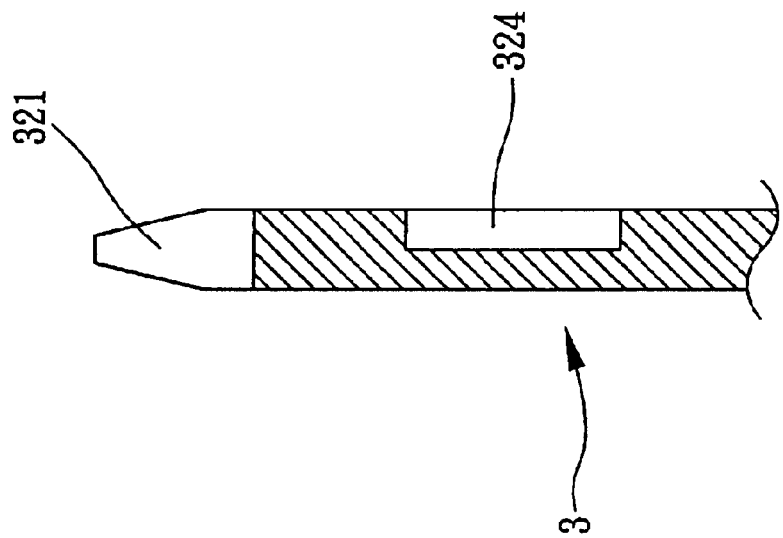
FIG. 3 is an illustration for "I—I" sectional view in FIG. 2 of the present invention.

One thing is worthy of attention, i.e. a downwardly cut portion 328 is further arranged at lower end of the curve surface 326, and a projection surface 325 is also further arranged on a tooth valley bottom edge between the first characteristic tooth 321 and the second characteristic tooth 322, these two structures play very important rolls on the present invention and will be described later. The cut portion 328 is located between the curve surface 326 and the top edge 3252 of the projection surface 325. The projection surface 325 is projecting out toward the smaller sprocket by using partial materials when the large sprocket 3 is formed by stamping, and the curvature design of the top edge 3252 of the projection surface 325 is formed in accordance with the bottom edge profile of the chain plate of the chain 4 shifting-up path and in match with the design of the shifting-up angle. The upper and lower dies of the projection surface are designed as a smaller one and a large one by the stamping formation, and the top edge 3252 of the projection surface 325 is stamped and formed into a slant angle 3251, which can be shown and referred in FIG. 3. Additionally, at the side where the second characteristic tooth 322 is toward the third characteristic tooth 323 (i.e. the non-force-acting side where the second characteristic tooth of the sprocket 3 drives the chain to rotate), a recessed tooth valley 327 structure is formed by deeply cutting in a predetermined curvature and depth, while the force-acting side of the third characteristic tooth 323 (left side of the figure) is then kept with the original tooth arc curing line, and its function will be described in detail later.

Figure 5:
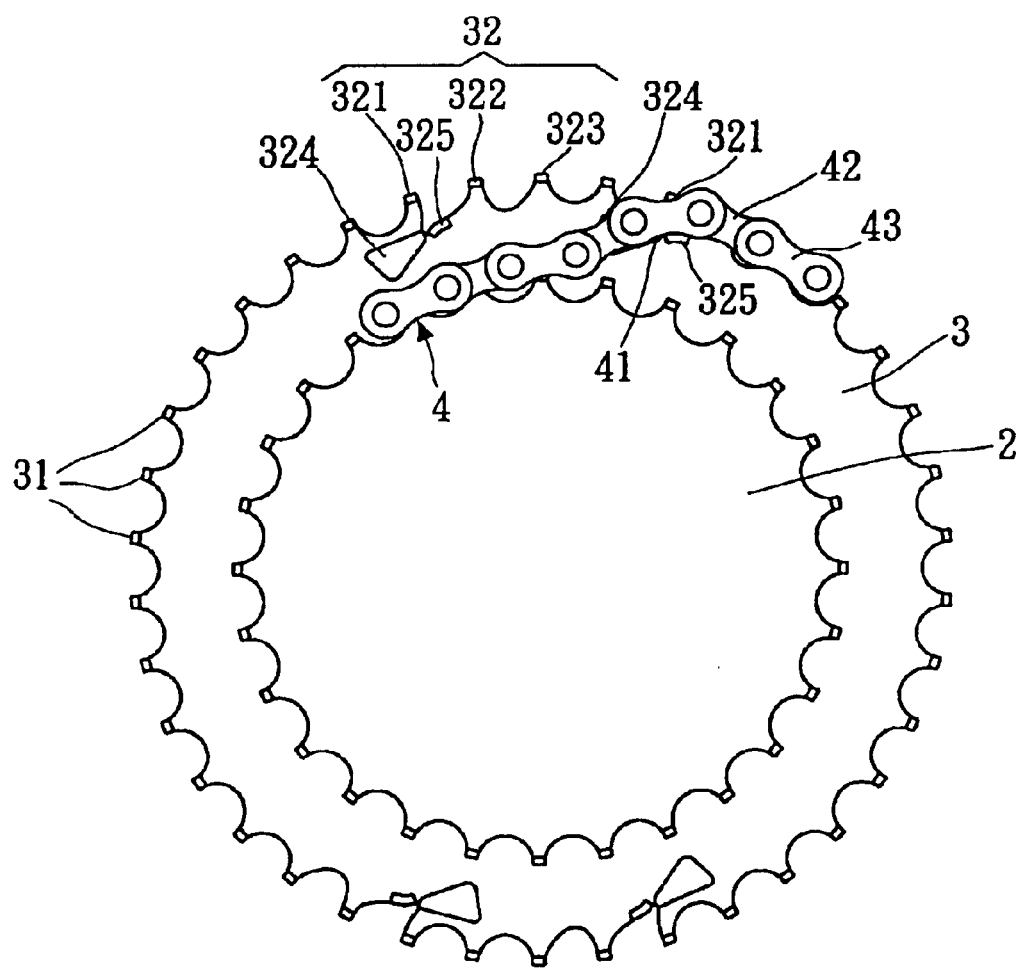
FIG. 5 is an illustration for the chaining-up embodiment of the tooth contour structure for large sprocket set of bicycle of the present invention (the first kind of chain shifting-up path).
Figure 6:
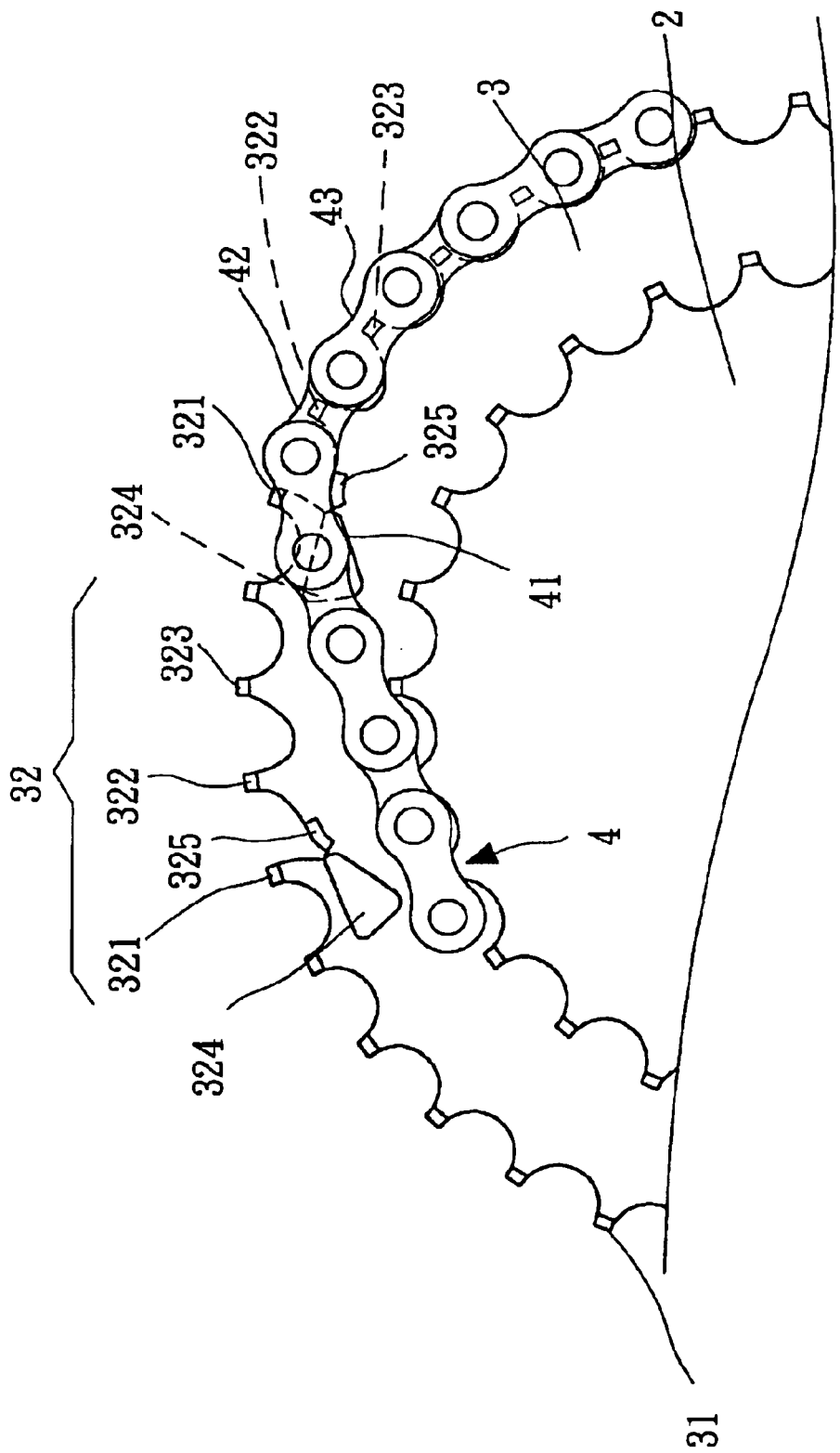
FIG. 6 is a partially enlarged view for FIG. 5.

Please refer to FIG. 5 and FIG. 6, wherein the FIG. 6 is a chaining-up embodiment illustration when the tooth contour structure for large sprocket set of bicycle of the present invention is in its first chain shifting-up path, and FIG. 6 is a partially enlarged view for the portion of the second tooth group in FIG. 5. In here. the so-called first chain shifting-up path is referred to when the chain 4 are chained-up (shifted-up) from the smaller sprocket 2 to larger sprocket 3, the first chain pitch 41 of the chain 4 is a wide chain pitch, and the position of outer chain plate of wide chain pitch (the first chain pitch 41) is just located at the position of the projection surface 325. At this time, the recession 324 may facilitate the left side head end of the outer chain plate of the first chain pitch 41 to be further biased toward the larger sprocket 3 and an interference phenomenon won't be happened, and it is also found from the figure that the bottom edge of the recession 324 is extended along the shifting-up direction of the chain 4. Thereby, the outer chain plate of the first chain pitch 41 may be effectively biased toward the larger sprocket 3 and therefore be butted against by the top edge 3252 of the projection surface 325. At this time, since the cut portion 328 is arranged at the lower end of the curve surface 326 and the left side end of the projection surface 325, so the lower end of the outer chain plate for the first chain pitch 41 may be firmly biased toward and butted against the top edge 3252 of the projection surface 325 and completely without the worrisome of interference. Furthermore, since the curvature of the top edge 3252 for the projection surface 325 is designed in accordance with the curvature of the bottom edge of the outer chain plate for the chain pitch 41 near its central portion profile and in match with the shifting-up angle (i.e. the contact between the chain pitch 41 and top edge 3252 is "surface" contact and is not "point" contact). And additionally the top edge 3252 is shown as a state of a slant angle 3251, so it will facilitate that as soon as the first chain pitch 41 is held against by the butting against surface 325, afterward when no matter how large is the load put on the chain 4, it all completely won't happen the phenomenon of loosening off. And, the curvature of the top edge 3252 for the projection surface 325 may further guide the shifting-up direction of the chain 4 effectively to make the second chain pitch 42 (which is a narrow chain pitch) be biased toward and butted against the surface of the second characteristic tooth 322, but still not set onto the second characteristic tooth 322 yet. Until the next wide chain pitch, i.e. the third chain pitch 43, then it will be accurately st into (or engaged with) the third characteristic tooth 323 to complete the shifting-up motion for the chain 4. From here we know that by the design for the position of the projection surface 325 and the curvature of the top edge 3252, the chain 4 may be guided and appropriately adjusted with accurate pitch to set onto the larger sprocket 3 to increase the probability and efficiency for successful shifting. Further, by the design of a recessed tooth valley 327 for the present invention, not only the left side end head (not numbered) won't be interfered with the second characteristic tooth 322, but also the third chain pitch 43 is made to be able to have a little tolerance of action to proceed some pitch adjustment for making the third chain pitch 43 be easily set onto the third characteristic tooth 323.

Figure 7:
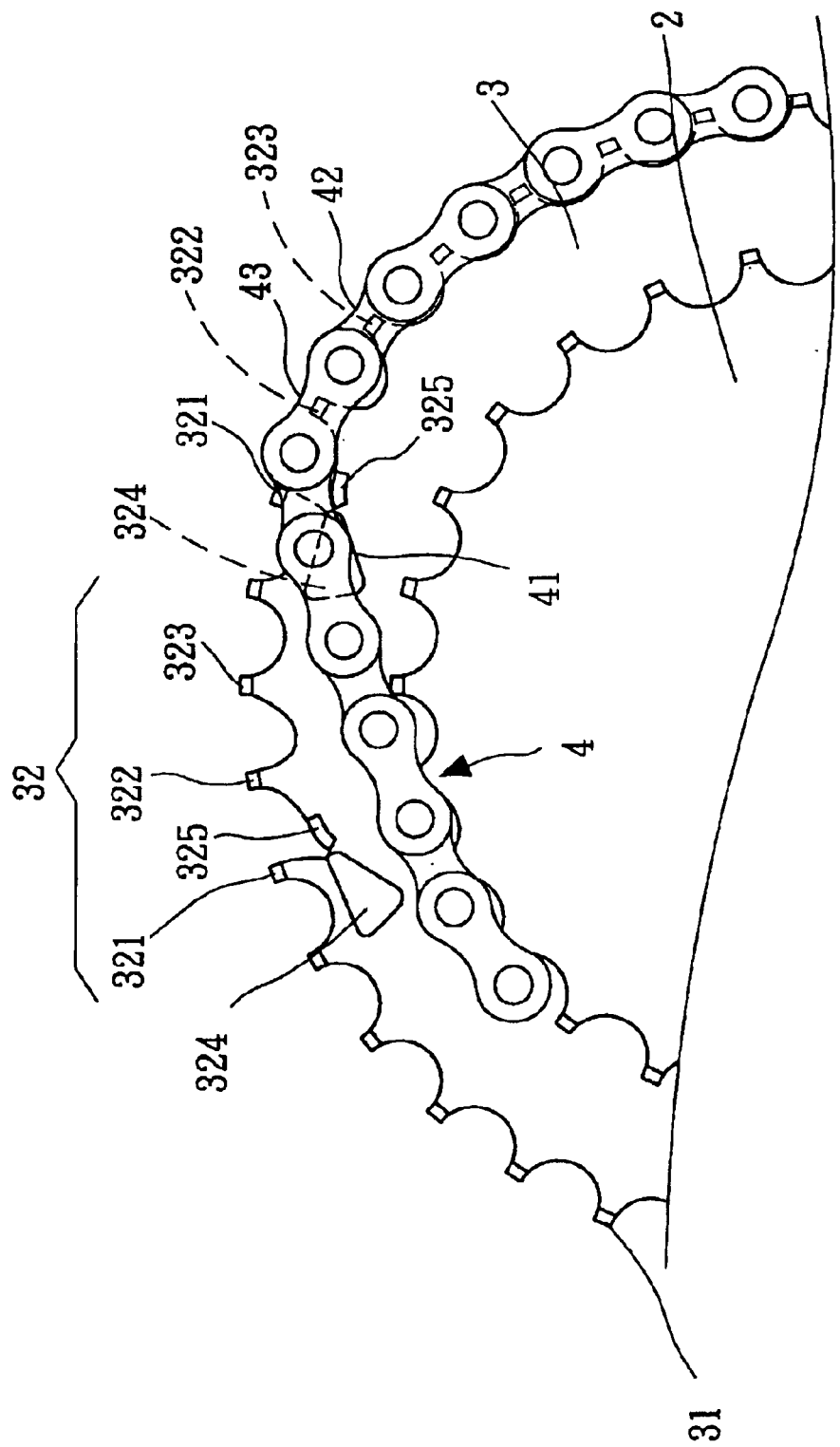
FIG. 7 is an embodiment illustration of another kind of chain shifting-up path for the tooth contour structure for large sprocket set of bicycle of the present invention.

Please refer to FIG. 7, which is an embodiment illustration for the present invention in the chain shifting-up path of the second kind. Here, the so-called chain shifting-up path of the second kind is referred to all the chain pitches of FIG. 6 that move in parallel with a chain pitch, therefore, the chain pitch that is located at the projection surface 325 will be a narrow chain pitch instead of a wide chain pitch. As shown in the figure, the right side head end of the first chain pitch 41 may be biased toward the larger sprocket 3 and without generating interference because of the arrangement of the recession 324. The second chain pitch 42 (narrow chain pitch) is just located at the position of the projection surface 325 and is difficult to be firmly held against by the top edge 3252 because the second chain pitch 42 is a narrow chain pitch. Relatively, since the third chain pitch 42 is a wide chain pitch, so the left side head end (not numbered) of the outer chain plate may be held against by the right half portion of the top edge 3252 to facilitate the third chain pitch 43 (wide chain pitch) to be directly set into (engaged with) the second characteristic tooth 322 (more early one tooth than the embodiment of the FIG. 6) to complete the motion of shifting-up. Since the chain holding against position in the second chain shifting-up path and the tooth position for completing the setting-into motion are all different to the chain shifting-up path of the second kind, so the design of chaining-up path and pitch for the chain is made to be different. Firstly, the curving circular measure of the curve surface 326 designed in the right side of the first characteristic tooth 321 is designed in accordance with the moving curves when the left side head end of the outer chain plate for the third chain pitch 43 are butted against the top edge 3252 of the projection surface 325 from the top to the bottom, and further in match with the cut portion 328 of its lower end, the left side head end of the outer chain plate for the third chain pitch 43 won't have the interference phenomenon. The pitch change makes the left side head end of the outer chain plate for the third chain pitch 43 may be held against by the top edge 3252 of the projection surface 325, and the structure of the recessed tooth valley 327 in the right side of the second characteristic tooth 322 again develops some function for adjusting the pitch to make the third chain pitch 43 be more easily set into (engaged with) the second characteristic tooth 322.

In other embodiment described hereafter, since most part of the element is same as that of the aforementioned embodiments, so same or similar element will be referred to same number and name, and its function won't be described repetitiously, however, for the reference number of the element with different structure, an English number is additionally attached behind the original number in order to make difference.

Figure 8:
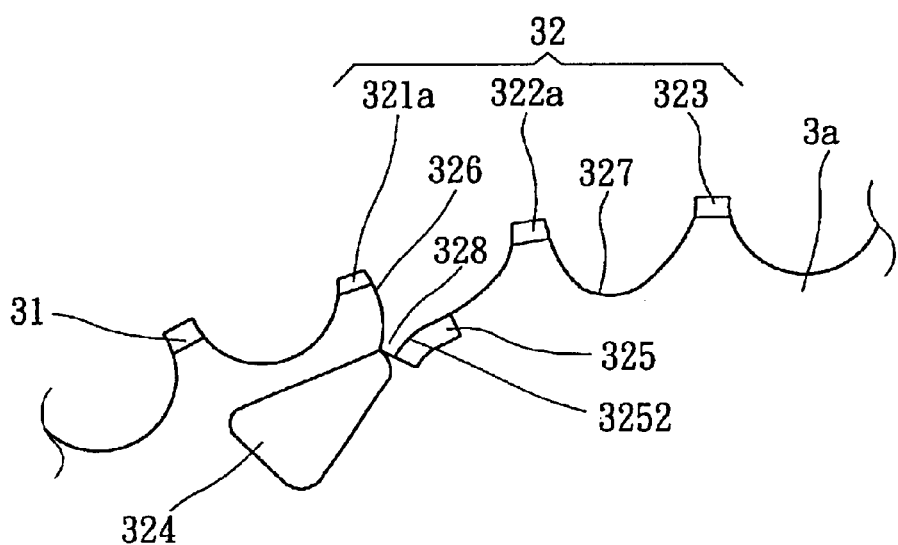
FIG. 8 is another preferable embodiment for the tooth contour structure for large sprocket set of bicycle of the present invention.

Please refer to FIG. 8, which is another preferable embodiment for the tooth contour structure for large sprocket set of bicycle of the present invention. The embodiment in FIG. 8 is substantially same as the aforementioned embodiment, i.e. a first characteristic tooth 321a, a second characteristic tooth 322a, and a third characteristic tooth 323 are arranged in sequence on the large sprocket 3a along the chain's shifting-up direction (i.e. reversing to the rotation direction of the sprocket). The right side and lower portion of the first characteristic tooth 321a are also individually arranged with a curve surface 326 and a recession 324. The tooth valley bottom edge between the first and second characteristic tooth similarly has a projection surface 325 formed by stamping. The left side of the projection surface 325 and the lower end of the curve surface 326 similarly has a cut portion 328. The right side tooth contour of the second characteristic tooth has been similarly possessed with a recessed tooth valley 327. The difference is that the tooth tops of the first characteristic tooth 321a and (or) the second characteristic tooth 322a may but cut off with a predetermined height to become a shorter short tooth. The shorter first and (or)the second characteristic tooth 321a, 322a may help to avoid the generation of interference during chain's shifting-up. For example, when the chain is chained-up as in aforementioned shifting-up path of second kind, the third chain pitch (wide chain pitch, not shown in this figure) will be directly set into the second characteristic tooth 322 since during the procedure that the left end head of the outer chain plate for the third chain pitch is held against the right side end of the projection surface 325 in moving from the top to the bottom (actually it is the rotation of the sprockets), although the curve surface 326 in the right side of the first characteristic tooth 321 has the function for avoiding the left end head of the external chain plate for the third chain pitch from interfering with the first characteristic tooth 321, but in order to void the abrupt occurrence of phenomenon of load change or swing for the chain during the shifting procedure and the third chain pitch is caused to be interference with the tooth top of the first characteristic tooth. Therefore, in this preferable embodiment, the first characteristic tooth 321a is specially designed as a shorter short tooth to avoid the occurrence of aforementioned situations.

From the structure characteristics of the aforementioned embodiments of the present invention, the tooth contour structure for large sprocket set of bicycle of the present invention applies the design of three characteristic tooth 321, 322, 323 formed by the manufacturing procedure of stamping, and in match with the structure features of projection surface 325, recession 324, cut portion 328, and recessed tooth valley 327, etc. has following several advantages:

1. The tooth valley profile between the first characteristic tooth 321 and the second characteristic tooth 322 for the present invention is formed into a projection surface 325, and the top edge 3252 of which is designed as being fulfilled with the curvature and direction of the moving path for the chain 4 to provide the chain plate of the chain 4 with firm holding and smooth gliding for assistance for chaining-up, not only large angle method is not needed for "raising up" the chain pitch for assistance for chaining-up, but also in the mean time, two different kinds of chain shifting path are adapted for reaching the function of "fixed-point shifting" and increasing the efficiency of shifting. Additionally, the top edge 3252 is applied with the method of "surface contact" instead of "point contact" for holding against the chain, and a design of slant angle 3251 is added to assure the chain can not be loosened off and enlarge the load of the chain. The successful shifting probability under the two different kinds of chain's shifting path in present invention is almost one hundred percentage, and the shifting efficiency is extremely high, in the mean time, the usage life of the butting against surface of the present invention is greatly increased (because the number of loosening off for the chain is decreased, then the probability of wearing-out for the butting against surface 325 is lowered).

2. The cut portion 328 of the present invention is located between the left end of the projection surface 325 and the lower side of the curve surface 326. It is not a recessive surface formed by forging, but is formed by cutting together with the cutting procedure for the tooth contour, so additional manufacturing procedure is not needed and the cost is lowered, and this structure characteristic is one emphasis of the present invention. Because the cutting portion 328 is just located at the left end of the projection surface 325, when in the shifting-up path of the first kind (as shown in FIG. 6), the outer chain plate of the chain may be biased accurately against the upper portion of the projection surface 325 at the position of the cut portion 328 and be held against thereof. If the position is formed into the recessed surface by forging instead of cutting, then not only additional forging procedure is needed and the cost of die equipment is higher, but also additional continuous tooth contour correction and thermal-treatment procedures are further needed, and while the outer chain plate of the chain can not be biased and swung accurately onto the middle upper portion of the cut portion 328 and can not be held against thereof. In the same theory, in the present invention, the projection surface 325 is located at the tooth valley profile instead of the positions of tooth top or the further lower portion of the tooth valley and this is also a very important feature. If the projection surface is located at the tooth top, as the example for the parallel moving tooth structure of the prior art, then it will have many increased failure probabilities as the aforementioned chain being raised too high, and the shortcoming of easily generating noise because of the parallel moving tooth interfering with the chain during normal operation. If the projection surface is located on the sprockets portion wherein is further below the tooth valley, then it will create a structure similar as the prior "convex point". Because there are factors that the convex point profile edge has round arc and the chain blocked by the sprocket is unable to be accurately biased against to the middle upper portion of the convex point, during high load the aforementioned chain is caused to be easily loosened off to make a failure for shifting and a bad circulation result for the convex point being easily worn out would be caused. From these, it can be proved that not only the design for the projection surface 325 of the present invention located at the tooth valley profile and matched with the cut portion is completely different in structure from the parallel moving tooth and convex point for the prior arts, but also the efficiency is further greatly increased.

3. The cutting portion of the present invention (including the recessed tooth valley 327 and the cut portion 328) all are located at non-force-acting side, and the tooth contour of the left side (pressured side) of each characteristic tooth is still kept the tooth contour curvature for general tooth, during the normal operation for the chain, the chain won't be suspended in the air, so the noise is quite low.

4. The present invention has arranged with the curve surface 326 and the cut portion 328 at the right side of the first characteristic tooth 321, the recessed tooth valley between the first characteristic tooth 322 and the third characteristic tooth 321, and the recession 321 at the lower portion of the first characteristic tooth, which not only can effectively avoid the occurrence of interference during the chain's chaining-up, but also parts further have the little adjustment for the pitch to reach the efficiency for accurately assistance for chaining-up.

5. All the aforementioned structure features for the present invention evenly don't need additional increased attached element or any manufacturing procedure, but may be totally involved into the manufacturing procedures for the original sprockets, so its manufacturing cost is extremely low, and the manufacturing technique is quite easy.

What is claimed is:

1. A tooth contour structure for a sprocket set of a bicycle comprising:

a) a small sprocket:

b) a large sprocket coaxially located with respect to the small sprocket and having at least one second tooth group, each at least one second tooth group having at least three characteristic teeth including a first characteristic tooth having a curved surface on a non-force-acting side thereof and a cut portion below the curved surface;

c) a recession formed in the large sprocket below the first characteristic tooth; and d) a projection surface integrally made with and extending from the large sprocket toward the small sprocket adjacent a tooth valley bottom edge between the first characteristic tooth and a second characteristic tooth, the projection surface having a top edge with a curvature matching a path and curvature of a chain, the cut portion being between the curved surface of the first characteristic tooth and the top edge of the projecting surface.

2. The tooth contour structure according to claim 1, wherein the top edge of the projection surface has a slant angle.

3. The tooth contour structure according to claim 1, wherein the recession extends from below the first characteristic tooth to below an adjacent tooth.

4. The tooth contour structure according to claim 1, further comprising:

a recessed tooth valley between the second characteristic tooth and a third characteristic tooth.

5. The tooth contour structure according to claim 1, wherein a tooth top of the first characteristic tooth is cut a predetermined amount, wherein the first characteristic tooth is shorter than a third characteristic tooth.

6. The tooth contour structure according to claim 1, wherein a tooth top of the second characteristic tooth is cut a predetermined amount, wherein the second characteristic tooth is shorter than a third characteristic tooth.

7. The tooth contour structure according to claim 1, wherein the large sprocket is made by a stamp-forming process.

* * * * *